(12) United States Patent
Saito

(10) Patent No.: US 7,292,404 B2
(45) Date of Patent: Nov. 6, 2007

(54) SIGNAL REPRODUCING METHOD AND STORAGE APPARATUS

(75) Inventor: Tomoaki Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 478 days.

(21) Appl. No.: 10/870,667

(22) Filed: Jun. 17, 2004

(65) Prior Publication Data

US 2004/0233802 A1 Nov. 25, 2004

Related U.S. Application Data

(62) Division of application No. 09/901,734, filed on Jul. 10, 2001, now Pat. No. 6,785,087.

(30) Foreign Application Priority Data

Feb. 16, 2001 (JP) .............................. 2001-040811

(51) Int. Cl.
*G11B 5/596* (2006.01)
(52) U.S. Cl. ............................... 360/78.09; 360/77.02; 360/78.04
(58) Field of Classification Search ..................... None
See application file for complete search history.

(56) References Cited

U.S. PATENT DOCUMENTS

| 4,549,232 A | 10/1985 | Axmear et al. |
| 6,680,812 B1 * | 1/2004 | Iwashiro ................. 360/78.06 |
| 7,136,256 B2 * | 11/2006 | Takaishi et al. ......... 360/78.04 |
| 2005/0052781 A1 * | 3/2005 | Park et al. ............... 360/78.06 |

FOREIGN PATENT DOCUMENTS

| JP | 60-10472 | 1/1985 |
| JP | 02-239477 | 9/1990 |
| JP | 03-260969 | 11/1991 |
| JP | 04-328367 | 11/1992 |
| JP | 5-258492 | 10/1993 |
| JP | 7-161158 | 6/1995 |
| JP | 2000-123506 | 4/2000 |
| JP | 20-00173210 | 6/2000 |
| WO | WO 99/36907 | 7/1999 |

* cited by examiner

*Primary Examiner*—Andrew L. Sniezek
(74) *Attorney, Agent, or Firm*—Greer, Burns & Crain, Ltd.

(57) ABSTRACT

A signal reproducing method reproduces servo information recorded on a recording medium by use of a head. A current calculation related to a current and an observer calculation related to a position and a velocity of the head are made based on reproduced servo information, and a current value for driving the head is calculated based on the above calculation result. Only computations which require a demodulation result of a present sample are made during a first time after demodulation of the position of the head to a time when the current value is output, and computations which require a demodulation result of a past sample are made during a second time other than the first time.

8 Claims, 15 Drawing Sheets

SIGNAL REPRODUCING METHOD AND STORAGE APPARATUS

This is a divisional of application Ser. No. 09/901,734, filed Jul. 10, 2001 now U.S. Pat. No. 6,785,087.

BACKGROUND OF THE INVENTION

This application claims the benefit of a Japanese Patent Application No.2001-040811, filed Feb. 16, 2001, in the Japanese Patent Office, the disclosure of which is hereby incorporated by reference.

1. Field of the Invention

The present invention generally relates to signal reproducing methods and storage apparatuses, and more particularly to a signal reproducing method for improving a phase margin of a control system, and to a storage apparatus which employs such a signal reproducing method.

2. Description of the Related Art

In a storage apparatus employing a Redundant Array of Independent Disks (RAID) structure, a plurality of hard disk drives (HDDs) are provided. In such a storage apparatus, a situation frequently occurs where a write is carried out in an on-track state with respect to one HDD and a seek to a target cylinder is carried out with respect to another HDD, at the same timing. In this situation, vibrations of the HDD which is carrying out the seek may affect the HDD which is carrying out the write and cause an off-track state, to thereby deteriorate the performance of the storage apparatus.

Recently, the track per inch (TPI) has increased to increase the recording density of recording media in the storage apparatus. As a result, the off-track state is easily generated even by a small external disturbance. In addition, in order to realize a high-speed access by reducing the access time, a large current is applied in order to accelerate and decelerate a head, thereby increasing vibration applied to the head. Therefore, it is becoming essential to increase the operation band of the control system in order to suppress the external disturbances.

However, in a reproducing system of the storage apparatus, a computation process which generates a signal for controlling the head position inevitably includes a computation (or execution) delay. For this reason, a phase margin of the control system is used up by this computation delay, and there was a first problem in that it is impossible to simply increase the gain of the control system.

On the other hand, when the gain of the control system is simply increased, the phase margin is reduced, and there was a second problem in that a closed loop will oscillate.

In the prior art, there was also a third problem in that, as the velocity of the head increases, it becomes more difficult to quickly and accurately detect the head velocity.

SUMMARY OF THE INVENTION

Accordingly, it is a general object of the present invention to provide a novel and useful signal reproducing method and storage apparatus, in which the problems described above are eliminated.

Another and more specific object of the present invention is to provide a signal reproducing method and storage apparatus which can eliminate the first problem, the second problem and/or the third problem described above, by securing a phase margin of a control system.

Still another object of the present invention is to provide a signal reproducing method for reproducing servo information recorded on a recording medium by use of a head, comprising the steps of (a) carrying out a current calculation related to a current, and an observer calculation related to a position and a velocity of the head, based on reproduced servo information, and (b) calculating a current value for driving the head, based on a calculation result of the step (a), where the step (b) carries out only computations which require a demodulation result of a present sample during a first time after demodulation of the position of the head to a time when the current value is output, and carrying out computations which require a demodulation result of a past sample during a second time other than the first time. According to the signal reproducing method of the present invention, it is possible to eliminate the first problem described above.

A further object of the present invention is to provide a signal reproducing method for reproducing servo information recorded on a recording medium by use of a head, comprising the steps of (a) obtaining a prediction error by subtracting an estimated position of the head from an actual position of the head on the recording medium obtained from reproduced servo information, and (b) feeding back the prediction error to a control system which calculates a current value for driving the head. According to the signal reproducing method of the present invention, it is possible to eliminate the second problem described above.

Another object of the present invention is to provide a signal reproducing method for reproducing servo information recorded on a recording medium by use of a head, comprising the steps of (a) demodulating phase information which is included in the servo information for use in demodulating an actual position of the head on the recording medium, and (b) obtaining a velocity of the head based on a phase error of the phase information demodulated by the step (a). According to the signal reproducing method of the present invention, it is possible to eliminate the third problem described above.

Still another object of the present invention is to provide a signal reproducing method for reproducing servo information recorded on a recording medium by use of a head, comprising the steps of (a) demodulating phase information which is included in the servo information for use in demodulating an actual position of the head on the recording medium, (b) obtaining a velocity of the head based on a phase error of the phase information demodulated by the step (a), (c) obtaining the velocity of the head based on a present demodulated position and a previous demodulated position, and (d) employing the velocity obtained by the step (b) when the velocity of the head is greater than or equal to a predetermined value, and employing the velocity obtained by the step (c) when the velocity of the head is less than the predetermined value. According to the signal reproducing method of the present invention, it is possible to eliminate the third problem described above.

A further object of the present invention is to provide a storage apparatus comprising reproducing means for reproducing servo information recorded on a recording medium by use of a head, matrix calculation means for carrying out a current calculation related to a current, and an observer calculation related to a position and a velocity of the head, based on reproduced servo information, and filter calculation means for calculating a current value for driving the head, based on a calculation result of the matrix calculation means, where the filter calculating means carries out only computations which require a demodulation result of a present sample during a first time after demodulation of the position of the head to a time when the current value is output, and carrying out computations which require a demodulation result of a past sample during a second time other than the first time. According to the storage apparatus of the present invention, it is possible to eliminate the first problem described above.

Another object of the present invention is to provide a storage apparatus comprising reproducing means for reproducing servo information recorded on a recording medium by use of a head, means for obtaining a prediction error by subtracting an estimated position of the head from an actual position of the head on the recording medium obtained from reproduced servo information, and feedback means for feeding back the prediction error to a control system which calculates a current value for driving the head. According to the storage apparatus of the present invention, it is possible to eliminate the second problem described above.

Still another object of the present invention is to provide a storage apparatus comprising reproducing means for reproducing servo information recorded on a recording medium by use of a head, position demodulating means for demodulating phase information which is included in the servo information for use in demodulating an actual position of the head on the recording medium, and velocity obtaining means for obtaining a velocity of the head based on a phase error of the phase information demodulated by the position demodulating means. According to the storage apparatus of the present invention, it is possible to eliminate the third problem described above.

A further object of the present invention is to provide a storage apparatus comprising reproducing means for reproducing servo information recorded on a recording medium by use of a head, position demodulating means for demodulating phase information which is included in the servo information for use in demodulating an actual position of the head on the recording medium, first velocity obtaining means for obtaining a velocity of the head based on a phase error of the phase information demodulated by the position demodulating means, second velocity obtaining means for obtaining the velocity of the head based on a present demodulated position and a previous demodulated position, and means for employing the velocity obtained by the first velocity obtaining means when the velocity of the head is greater than or equal to a predetermined value, and employing the velocity obtained by the second velocity obtaining means when the velocity of the head is less than the predetermined value. According to the storage apparatus of the present invention, it is possible to eliminate the third problem described above.

Other objects and further features of the present invention will be apparent from the following detailed description when read in conjunction with the accompanying drawings.

DESCRIPTION OF THE PREFERRED EMBODIMENTS

Figure 1:
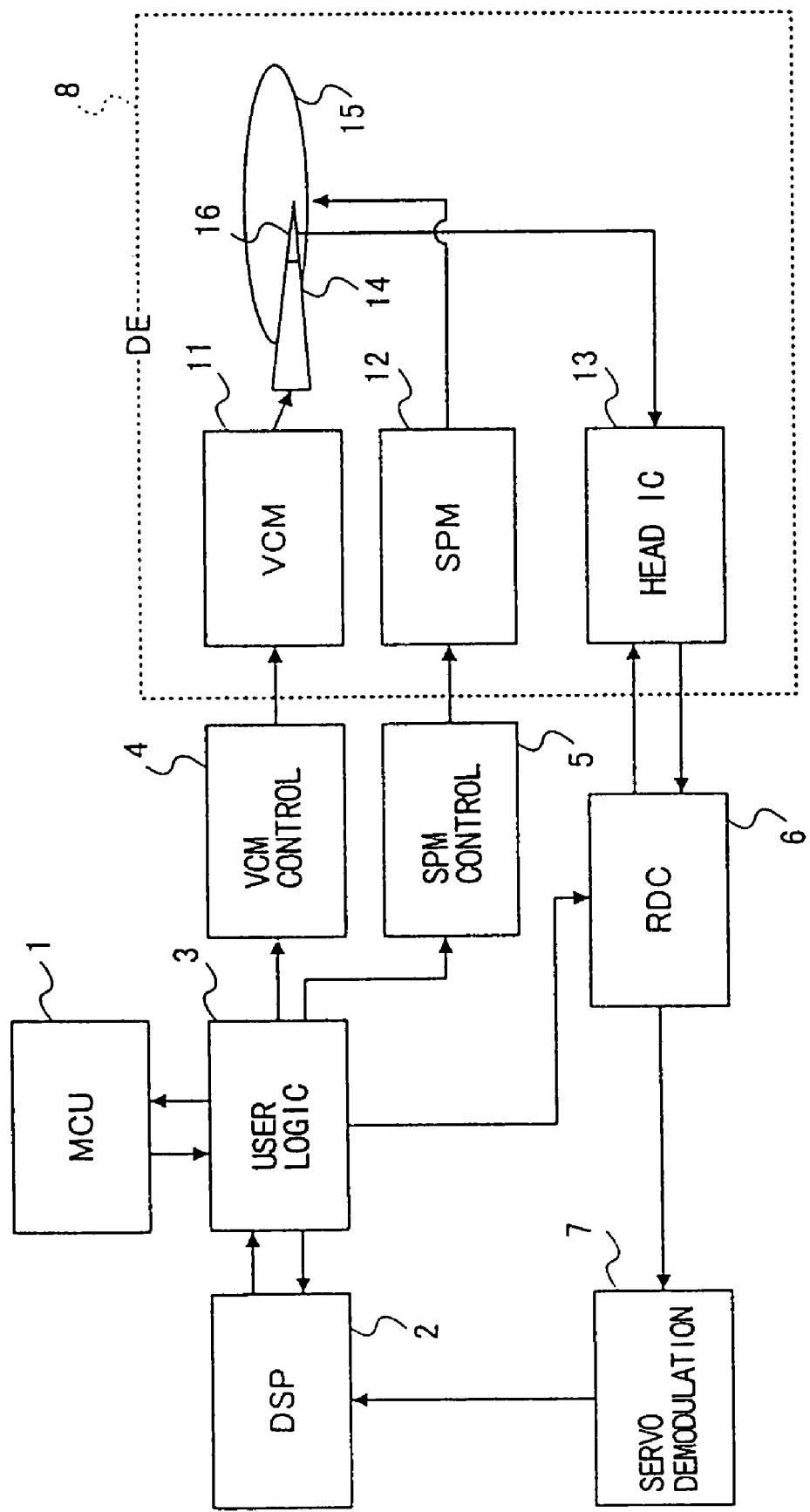
FIG. 1 is a system block diagram showing a first embodiment of a storage apparatus according to the present invention.

A description will be given of embodiments of a signal reproducing method according to the present invention and a storage apparatus according to the present invention, by referring to the drawings.

FIG. 1 is a system block diagram showing a first embodiment of the storage apparatus according to the present invention. This first embodiment of the storage apparatus employs a first embodiment of the signal reproducing method according to the present invention. In this embodiment, the present invention is applied to a magnetic disk unit having the RAID structure.

The magnetic disk unit shown in FIG. 1 generally includes a micro controller unit (MCU) 1, a digital signal processor (DSP) 2, a user logic circuit 3, a voice coil motor (VCM) control circuit 4, a spindle motor (SPM) control circuit 5, a read/write channel (RDC) 6, a servo demodulation circuit 7, and a disk enclosure (DE) 8. The disk enclosure 8 includes a VCM 11, a SPM 12, a head IC 13, an arm 14 mounted with a magnetic head 16, and a magnetic disk 15. For the sake of convenience, only one magnetic disk 15 is shown in FIG. 1. However, a plurality of magnetic disks 15 are actually provided, and corresponding numbers of VCMs 11, arms 14 and magnetic heads 16 are provided depending on the number of magnetic disks 15.

The head IC 13, the read/write channel 6, the servo demodulation circuit 7, the DSP 2 and the user logic circuit 3 form a reproducing system. In addition, a control system includes the VCM control circuit 4 and the SPM control circuit 5 in addition to the reproducing system. A recording system includes the DSP 2, the user logic circuit 3, the read/write channel 6 and the head IC 13, but a description of the recording system will be omitted in this specification because the recording system is not directly related to the subject matter of the present invention. The DSP 2, the user logic circuit 3 and the VCM control circuit 4 form a circuit means for instructing a current to be supplied to the VCM 11. The head IC 13, the read/write channel 6 and the servo demodulation circuit 7 form a circuit means for demodulating a present position of the magnetic head 16 on the magnetic disk 15.

For example, the DSP 2 receives a seek command from the MCU 1 via the user logic circuit 3. The DSP 2 calculates a current value for moving the arm 14 to a cylinder position and head position specified by the seek command, and instructs the current value with respect to the VCM control circuit 4. The VCM control circuit 4 generates a current for driving the VCM 11, and the arm 14 is moved depending on the current value. After the operation of moving the arm 14 to the specified cylinder position and head position is completed, an on-track operation is continued at this position until a next command is received from the MCU 1.

The SPM control circuit 5 generates a control signal for rotating the magnetic disk 15 at a rotational velocity which is specified from the DSP 2 via the user logic circuit 3, and supplies the generated control signal to the SPM 12. Hence, the magnetic disk 15 is rotated at the specified rotational velocity by the SPM 12.

The head IC 13 includes an amplifying function to amplify a read signal which is read from the magnetic disk 15 by the magnetic head 16. The read/write channel 6 carries out processes with respect to the read signal, including a filtering process and an automatic gain control (AGC) process, to shape the signal waveform. The servo demodulation circuit 7 carries out a demodulation process with respect to the signal waveform which is shaped by the read/write channel 6, so as to demodulate the present position of the magnetic head 16 on the magnetic disk 15 according to a demodulation algorithm. The DSP 2 determines a current value which is to be output next, based on a demodulation result of the servo demodulation circuit 7. A VCM control is carried out by such a closed loop.

Figure 2:
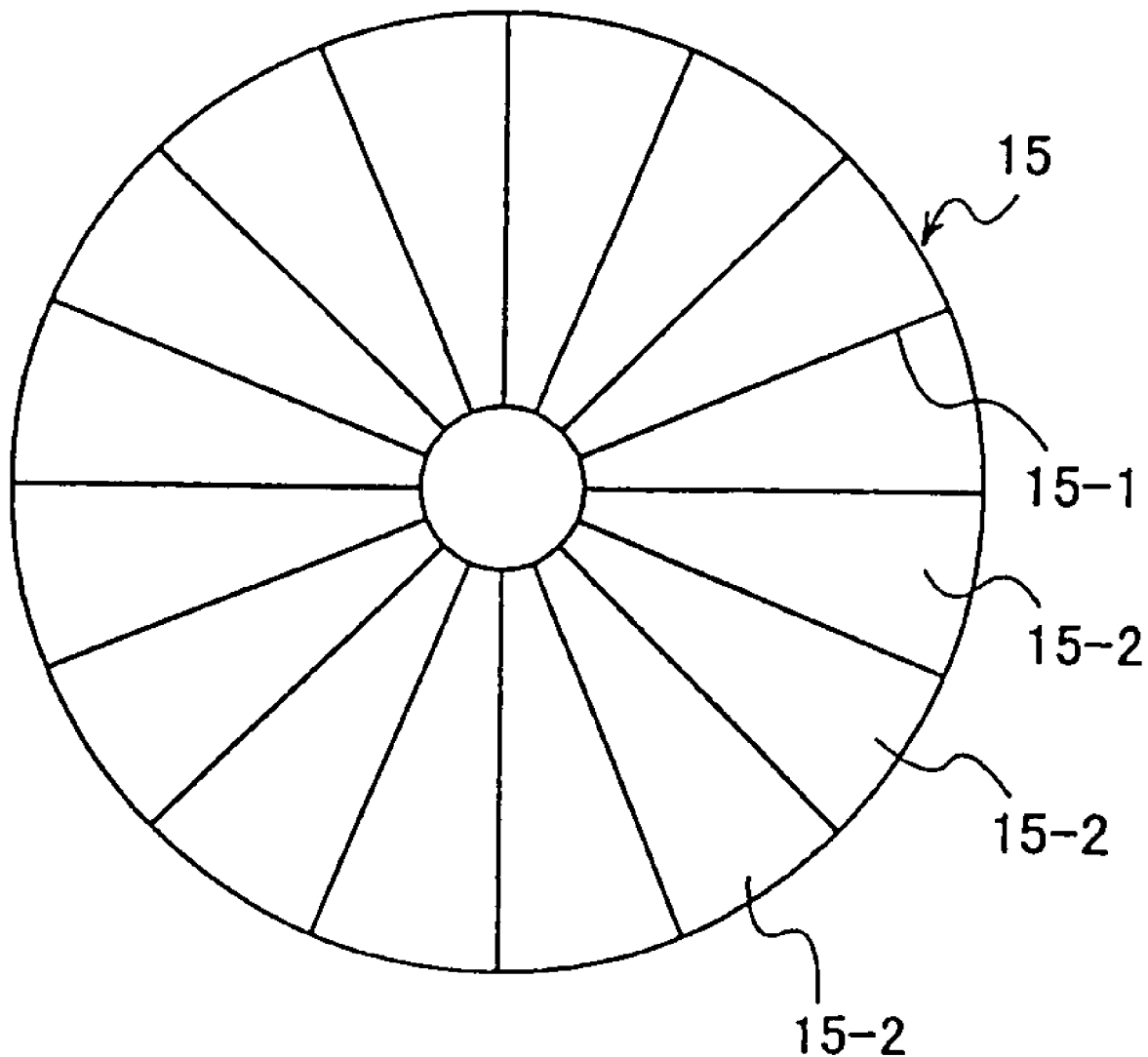
FIG. 2 is a diagram for explaining servo information on a magnetic disk.

FIG. 2 is a diagram for explaining servo information on the magnetic disk 15. As shown in FIG. 2, this embodiment employs the embedded servo system, and thus, the servo information is recorded on the magnetic disk 15 in servo regions 15-1 which extend radially on the magnetic disk 15 so as to partition data recording regions 15-2 where the data are recorded. Since the servo information is intermittently recorded in one track turn on the magnetic disk 15, a servo gate signal is generated as a window for demodulating the servo information from the reproduced signal. The generation and control of the servo gate signal are carried out by a circuit within the user logic circuit 3. In addition, a voltage controlled oscillator (VCO) counter which is used to count or measure the time from one servo information to a time when the next servo information is obtained, is also provided within the user logic circuit 3. The resetting and setting of a maximum counted value with respect to the VCO counter, the timing control of ON/OFF states of the servo gate signal and the like are carried out by the DSP 2.

Figure 3:
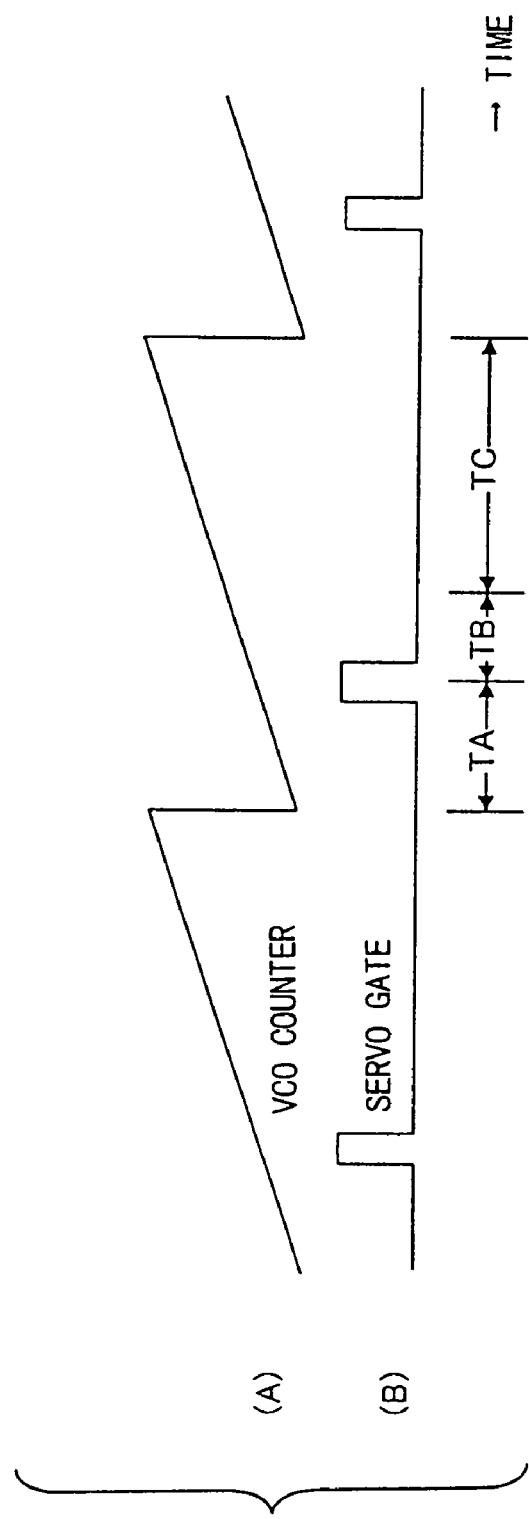
FIG. 3 is a timing chart for explaining a computation delay.

FIG. 3 is a timing chart for explaining a computation (or execution) delay. In FIG. 3, (A) indicates the counted value of the VCO counter, and (B) indicates the servo gate signal. In addition, TA denotes a time from the start of an interrupt to the position demodulation, TB denotes a time after the position demodulation to a time when the current value is output, and TC denotes a time after the current value is output to a time when a next interrupt is generated. The computation delay corresponds to the time TB. When the computation delay becomes large, the phase margin of the control system is used up by the computation delay. Hence, it is necessary to minimize the computation delay. In other words, it is important to suppress a computation process carried out within the time TB to a minimum.

Figure 4:
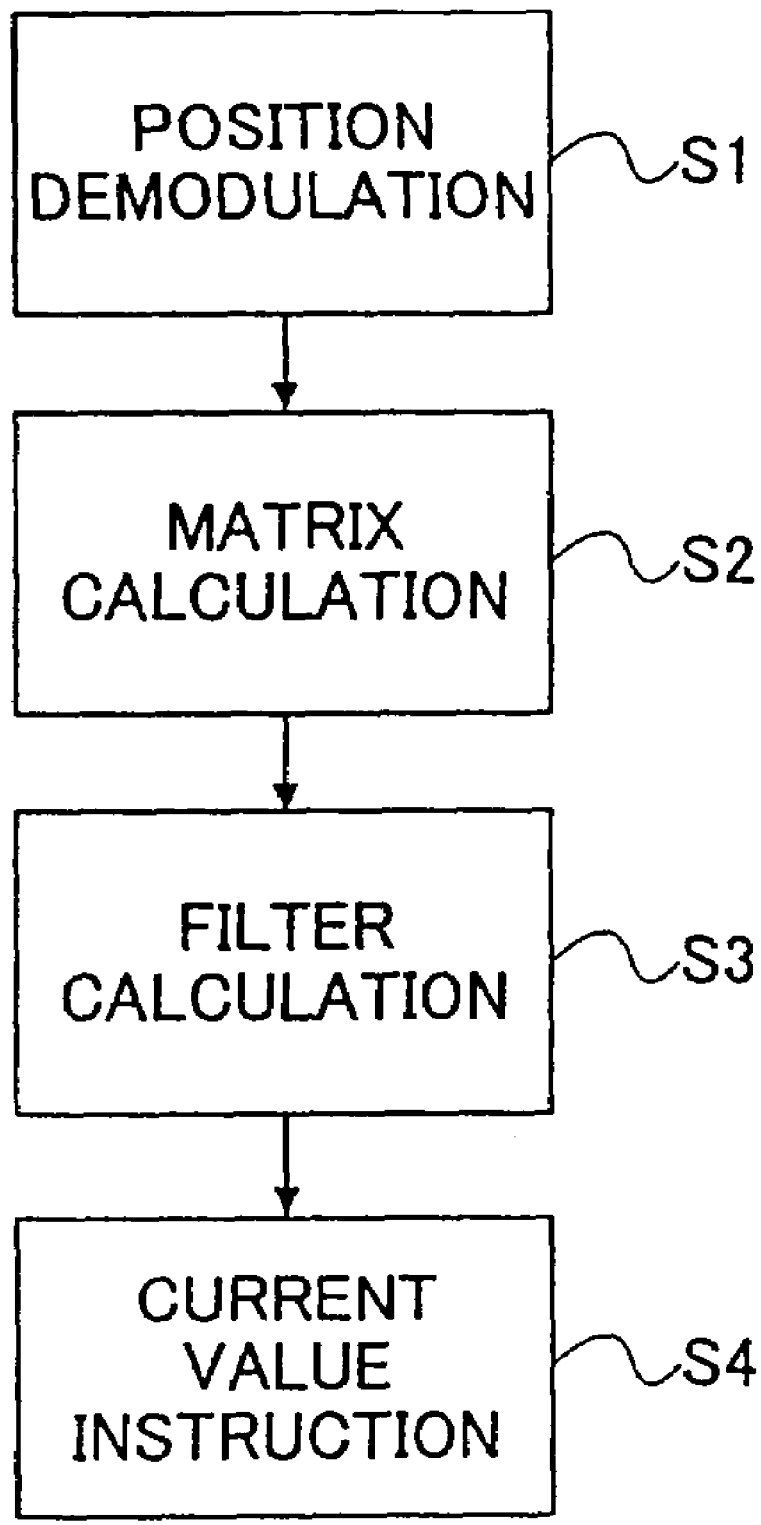
FIG. 4 is a flow chart for explaining an important part of a process carried out by a reproducing system.

FIG. 4 is a flow chart for explaining an important part of a process carried out by the reproducing system. More particularly, FIG. 4 shows the process of the DSP 2 carried out during the time TB.

In FIG. 4, when a step S1 starts an interrupt to carry out the position demodulation, a step S2 carries out a matrix calculation. The matrix calculation includes a current calculation and an observer calculation. The current calculation carries out calculations related to currents within the magnetic disk unit. On the other hand, the observer calculation carries out calculations for obtaining the present position of the magnetic head 16 on the magnetic disk 15, the present velocity of the magnetic head 16 and the like. A step S3 carries out a filter calculation based on the result of the matrix calculation, and calculates the current value which is instructed to the VCM control circuit 4 in order to drive the VCM 11. A step S4 instructs the calculated current value to the user logic circuit 3. Of course, it is possible to reduce the processing time to a certain extent and reduce the computation delay, by carrying out only the current calculation of the matrix calculation during the time TB, and carrying out the observer calculation of the matrix calculation during the time TC.

In this embodiment, a part of the filter calculation is carried out during the time TA and/or the time TC, and only a remaining part of the filter calculation is carried out during the time TB, so as to further reduce the processing time of the computations carried out during the time TB.

When an input is denoted by u(k) and an output is denoted by y(k), an nth-order filter calculation can be described by the following formula (1), where $a_i$ denotes a coefficient of the filter denominator, and $b_i$ denotes a coefficient of the filter numerator.

$$y(k)=[(b_0+b_1 z^{-1}+b_2 z^{-2}+\ldots+b_n z^{-n})/(1+a_1 z^{-1}+a_2 z^{-2}+\ldots+a_n z^{-n})]u(k) \quad (1)$$

The formula (1) can be rewritten in the form of the following formula (2).

$$y(k) = -\sum_{i=1}^{n} a_i y(k-i) + \sum_{i=1}^{n} b_i u(k-i) + b_0 u(k) \quad (2)$$

Accordingly, by carrying out the calculations of the following formula (3), which can be made based on a past sample, during the time TA and/or TC, and carrying out the calculations of the following formula (4), which requires the demodulation result of the present sample, during the time TB after the position is demodulated, it is possible to greatly reduce the processing time of the computations carried out during the time TB. This effect of reducing the processing time becomes longer as the value of n of the nth-order filter larger.

$$tmp(k) = -\sum_{i=1}^{n} a_i y(k-i) + \sum_{i=1}^{n} b_i u(k-i) \quad (3)$$

$$y(k) = tmp(k) + b_0 u(k) \quad (4)$$

Figure 5:
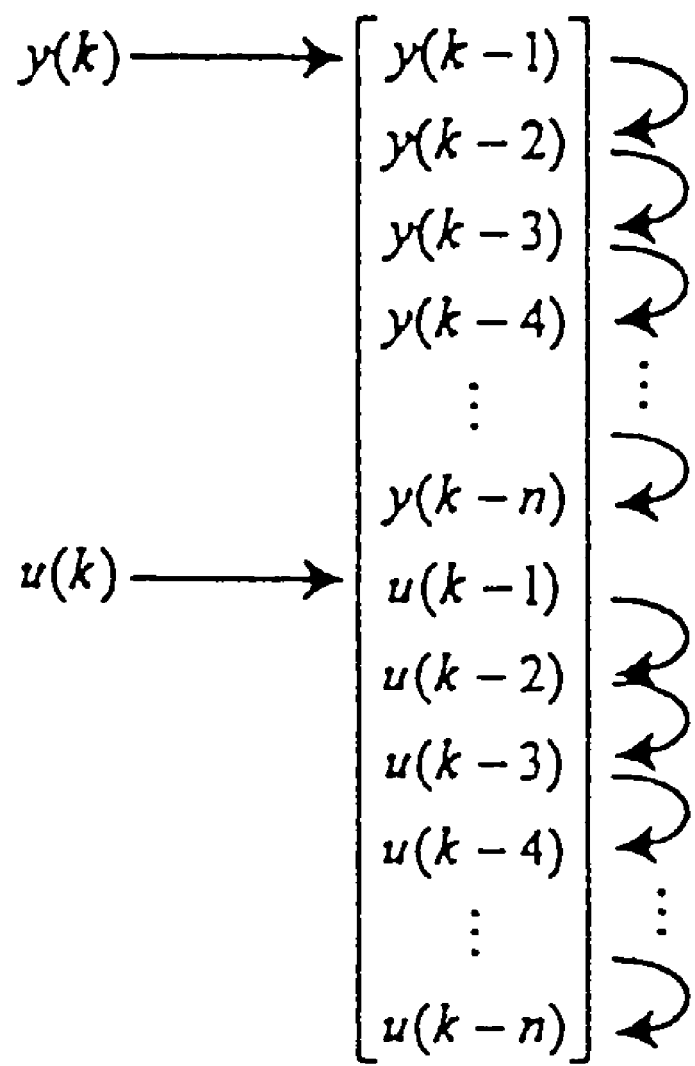
FIG. 5 is a diagram for explaining a past sample shift process.

Furthermore, as may be seen from FIG. 5, a past sample shift process also applies a relatively large load on the DSP 2. Hence, the processing time of the computations carried out during the time TB can further be reduced by also carrying out this past sample shift process during the time TA and/or the time TC.

Figure 6:
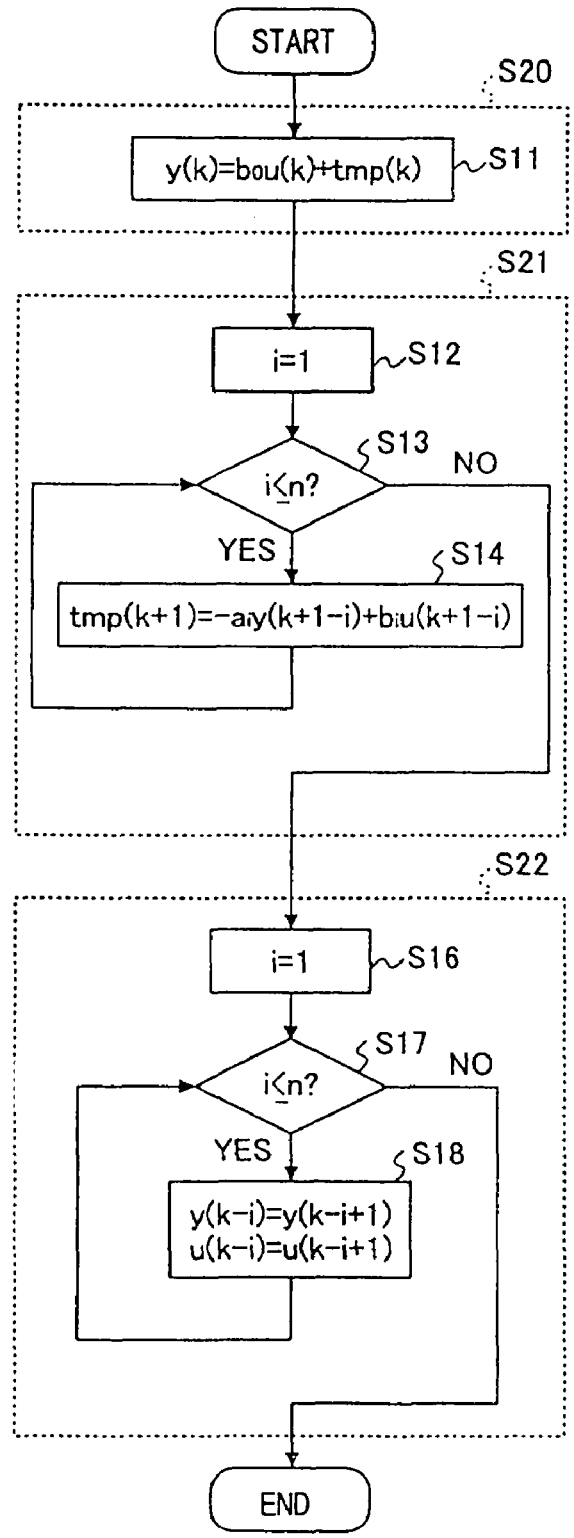
FIG. 6 is a flow chart for explaining a filter calculation.

FIG. 6 is a flow chart for explaining the filter calculation. In FIG. 6, a step S11 sets y(k) to y(k)=$b_0$u(k)+tmp(k). This step S11 forms a computation process part S20 for carrying out a first main calculation. A step S12 sets i to i=1. A step S13 decides whether or not i is less than or equal to n. If the decision result in the step S12 is YES, a step S14 calculates tmp(k+1)=−$a_i$y(k+1−i)+$b_i$u(k+1−i), and the process returns to the step S13. If the decision result in the step S13 is NO, the process advances to a step S16. The steps S12 through S14 form a computation process part S21 for carrying out a second main calculation.

The step S16 sets i to i=1, and a step S17 decides whether or not i is less than or equal to n. If the decision result in the step S17 is YES, a step S18 calculates y(k−i)=y(k−i+1) and u(k−i)=u(k−i+1), and the process returns to the step S17. The process ends if the decision result in the step S17 is NO. The steps S16 through S18 form a vector shift process part S22 for carrying out the shift process described above.

The step S11 of the computation process part S20 is carried out during the time TB. The steps S12 through S14 of the computation process part S21 are carried out during the time TA and/or the time TC. In addition, the steps S16 through S18 of the vector shift process part S22 are carried out during the time TA and/or the time TC.

According to this embodiment, during the time TB after the position demodulation to the time when the current value is output, it is only necessary to carry out approximately 10 to 20 percent of the filter calculation, that is, the computation process which requires the demodulation result of the present sample. As a result, it is possible to greatly reduce the computation delay. In addition, the effect of reducing the computation delay becomes longer as the value n of the nth-order filter becomes larger. Thus, even if the control section and the filter section of the storage apparatus should become more complex in the future, it would be possible to effectively reduce the computation delay.

The remaining computation process of the filter calculation, which can be carried out based on the past sample, may be carried out during the time TA and/or the time TC, depending on the time margin.

Next, a description will be given of a second embodiment of the storage apparatus according to the present invention. This second embodiment of the storage apparatus employs a second embodiment of the signal reproducing method according to the present invention. In this embodiment, the present invention is applied to the magnetic disk unit having the RAID structure. The basic structure of this second embodiment of the storage apparatus is the same as the basic structure of the first embodiment of the storage apparatus shown in FIG. 1, and illustration and description thereof will be omitted.

Figure 7:
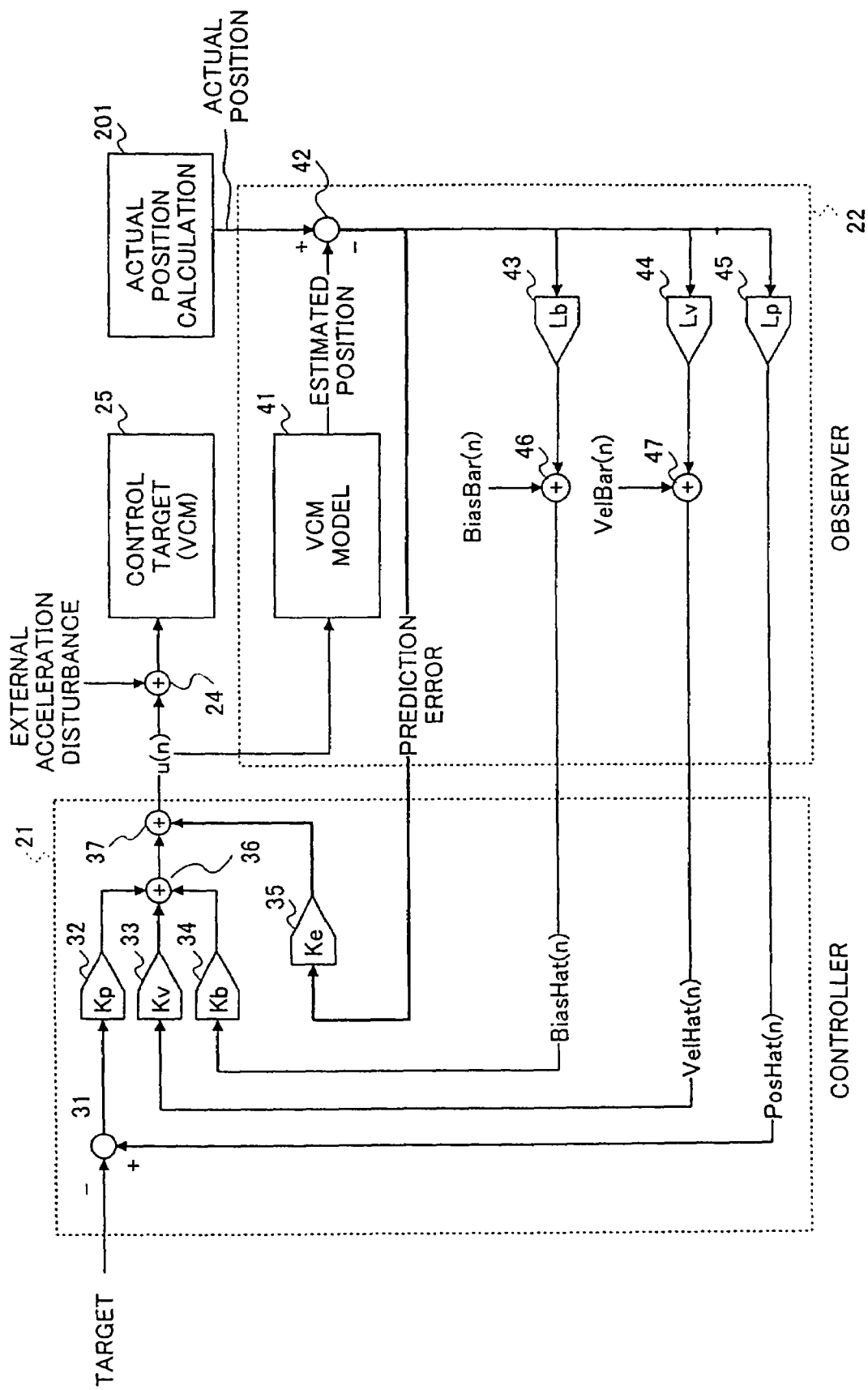
FIG. 7 is a functional block diagram for explaining an operation of an important part of a second embodiment of the storage apparatus according to the present invention.

FIG. 7 is a functional block diagram for explaining an operation of an essential part of this second embodiment of the storage apparatus. In FIG. 7, a controller 21 includes a subtracting unit 31 which receives an input target position, multipliers 32, 33, 34 and 35 for multiplying corresponding multiplying coefficients Kp, Kv, Kb and Ke, and adders 36 and 37. An observer 22 includes a VCM model 41, a subtracting unit 42, multipliers 43, 44 and 45 for multiplying corresponding multiplying coefficients Lb, Lv and Lp, and adders 46 and 47. The controller 21 and the observer 22 correspond to the DSP 2 shown in FIG. 1.

For the sake of convenience, it is assumed that an output u(n) of the controller 21 which is output from the adder 37 corresponds to the output which is obtained via the user logic circuit 3 and the VCM control circuit 4 shown in FIG. 1, and is supplied to the adder 24 and the VCM model 41 of the observer 22. External acceleration disturbance is also supplied to the adder 24, and an output of the adder 24 is supplied to a control target 25. The control target 25 corresponds to the VCM 11 shown in FIG. 1.

An actual position calculation unit 201 corresponds to the magnetic head 16, the head IC 13, the read/write channel 6 and the servo demodulation circuit 7 shown in FIG. 1. This actual position calculation unit 201 supplies an actual position of the magnetic head 16 on the magnetic disk 15, which is obtained to the subtracting unit 42 of the observer 22. Hence, an estimated position of the magnetic head 16, which is output from the VCM model 41 is subtracted from the actual position by the subtracting unit 42, and an output of the subtracting unit 42 is fed back, as a prediction error, to the controller 21 via the multiplier 35.

In FIG. 7, BiasBar(n) input to the adder 46 denotes a prediction bias, VelBar(n) input to the adder 47 denotes a predicted velocity, BiasHat(n) output from the adder 46 denotes an estimation bias, VelHat(n) output from the adder 47 denotes an estimated velocity, and PosHat(n) output from the multiplier 45 denotes an estimated position. When an arbitrary coefficient is denoted by L, the estimated value can be described by (estimated value)=(predicted value)+[L× (prediction error)] by making a correction with respect to the present predicted value using the prediction error. In addition, the predicted value is equal to the estimated value for the bias, and is calculated based on a physical formula v=v0+at with respect to the velocity. Accordingly, VelBar(n+1) can be described by VelBar(n+1)=VelHat(n)+[BiasHat(n)+u(n)]×ts, and BiasBar(n+1) can be described by BiasBar(n+1)=BiasHat(n).

When there is no external acceleration disturbance and there is totally no error in the model, the prediction error output from the subtracting unit 42 becomes zero. Hence, in this embodiment, the prediction error is regarded as a kind of external disturbance, and a feedback path is provided to feed back the prediction error as indicated by a bold solid line in FIG. 7, so that the gain can be increased without wasting the phase margin of the control system. In other words, in the case of a control system which is designed to have the same gain as a conventional control system, this embodiment can improve the phase margin. In addition, since this embodiment has a simple structure which merely adds the feedback path indicated by the bold solid line in FIG. 7 to the conventional control system, it is possible to easily realize the control system without increasing the order of the controller 21.

Next, a description will be given of a modification of the second embodiment of the storage apparatus, by referring to FIGS. 8 through 10. According to a multi-rate control, the current is output to the VCM 11 in a plurality of steps with respect to one servo demodulation operation, so as to more smoothly control the movement of the magnetic head 16. When such a multi-rate control is carried out for the feedback of the prediction error in the second embodiment described above, it is desirable to further improve the phase margin. Hence, in this modification, the feedback of the prediction error is concentrated in the first half portion of the multi-rate output.

Figure 8:
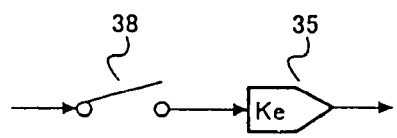
FIG. 8 is a diagram showing an important part of a modification of the second embodiment of the storage apparatus.

FIG. 8 is a diagram showing an important part of this modification of the second embodiment. As shown in FIG. 8, a switch 38 is provided on the input side of the multiplier 35 in this modification. For example, the switch 38 is provided in the controller 21. In a case where a 4-times multi-rate control is carried out, for example, the ON/OFF state of the switch 38 is controlled so that, of the four current values output to the VCM 11, the prediction error feedback is carried out only with respect to the first current value, and no prediction error feedback is carried out with respect to the remaining three current values. In this case, a multiplying coefficient Ke of the multiplier 35 is set to approximately four times the value for a case where the prediction error feedback is uniformly carried out with respect to the four current values output to the VCM 11. Hence, it is possible to quickly make the correction when the prediction error is generated.

Figure 9:
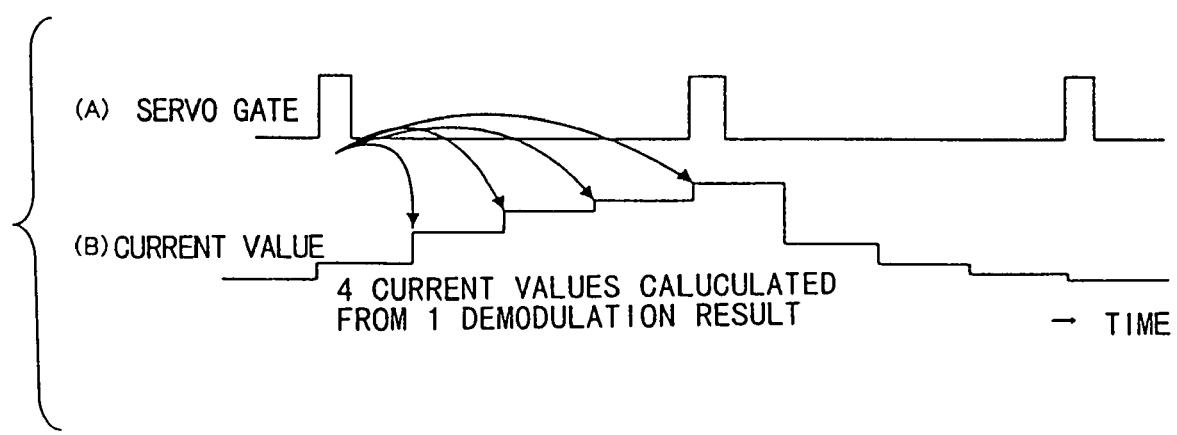
FIG. 9 is a timing chart for explaining an operation of the modification of the second embodiment.

FIG. 9 is a timing chart for explaining the operation of this modification of the second embodiment. In FIG. 9, (A) shows the servo gate signal, and (B) shows the current value instructed with respect to the VCM control circuit 4.

Figure 10:
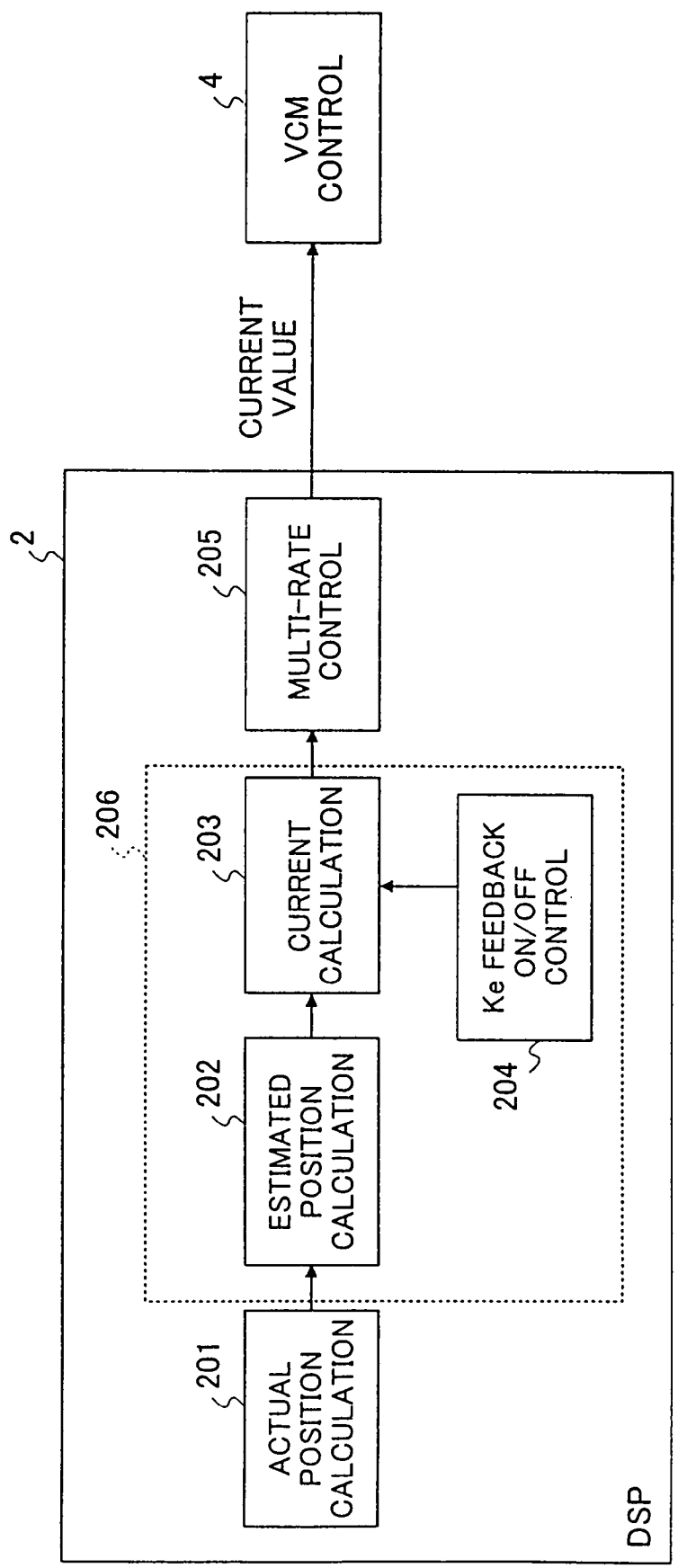
FIG. 10 is a functional block diagram showing an important part of the modification of the second embodiment.

FIG. 10 is a functional block diagram showing an important part of this modification of the second embodiment of the storage apparatus. In FIG. 10, the DSP 2 includes the actual position calculation unit 201, an estimated position calculation unit 202, a current calculation unit 203, a Ke feedback ON/OFF control unit 204, and a multi-rate control unit 205. A circuit part 206 surrounded by a dotted line and including the estimated position calculation unit 202, the current calculation unit 203 and the Ke feedback ON/OFF control unit 204 corresponds to the controller 21 and the observer 22 shown in FIG. 7.

Similarly to the case shown in FIG. 7, the actual position calculation unit 201 calculates and outputs the actual position of the magnetic head 16 on the magnetic disk 15. In the case of the 4-times multi-rate control, for example, the circuit part 206 operates four times with respect to one operation of the actual position calculation unit 201. Similarly to the case of the VCM model 41 shown in FIG. 7, the estimated position calculation unit 202 calculates and outputs the estimated position of the magnetic head 16 on the magnetic disk 15. The current calculation unit 203 uses the actual position and the estimated position, to calculate and output the current value which is to be instructed with respect to the VCM control circuit 4. In the case of the 4-times multi-rate control, the Ke feedback ON/OFF control unit 204 controls the ON/OFF state of the prediction error feedback, by carrying out the prediction error feedback only with respect to the first current value of the four current values output to the VCM control circuit 4, and carrying out no prediction error feedback with respect to the remaining three current values of the four current values. Of the four current values output from the current calculation unit 203, the multi-rate control unit 205 outputs the first current value with respect to the VCM control circuit 4 simultaneously as when the calculation in the current calculation unit 203 ends, and holds the second through fourth current values. The multi-rate control unit 205 outputs the second through fourth current values with respect to the VCM control circuit 4 at respective times based on the counted value of the VCO counter.

Figure 11:
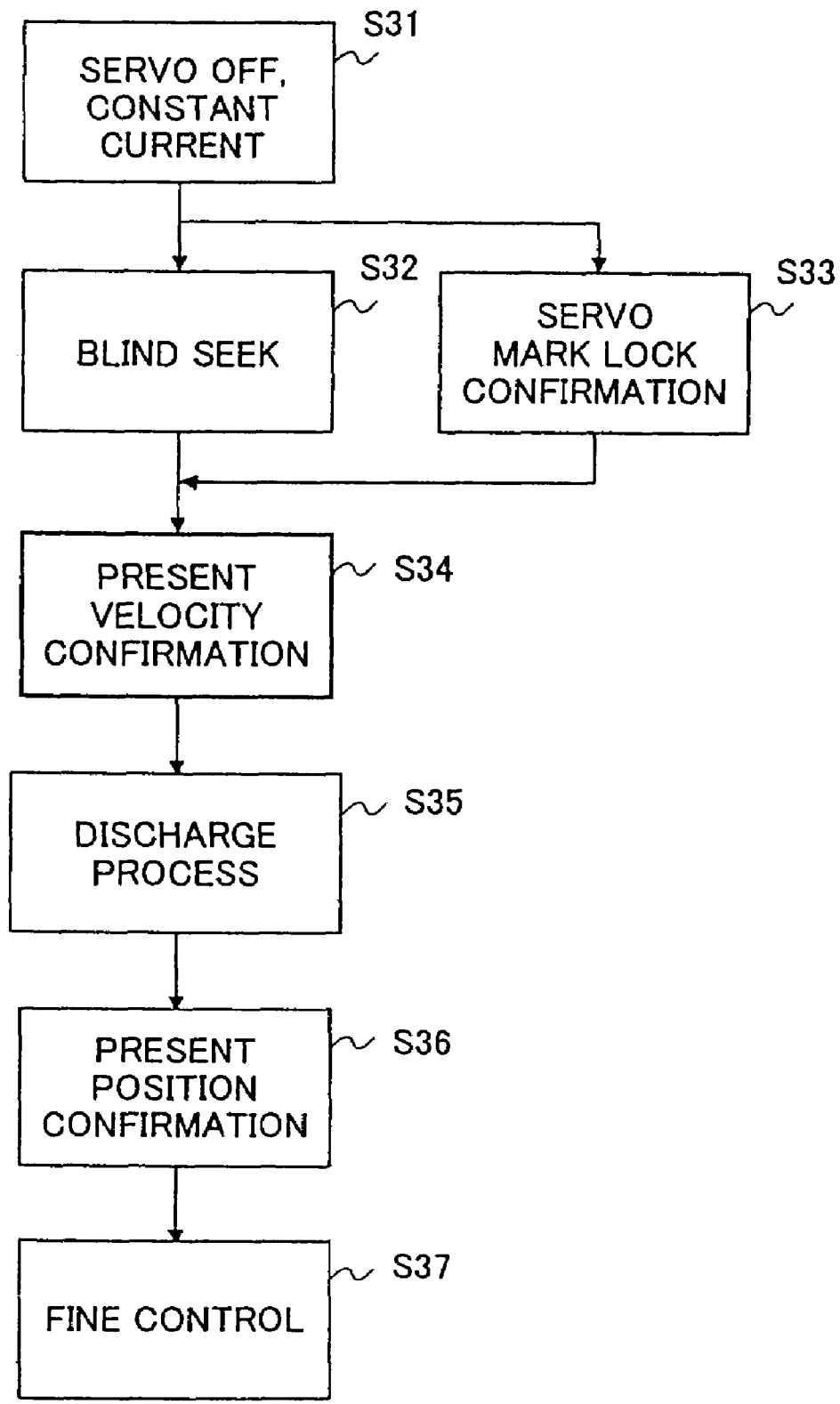
FIG. 11 is a flow chart for explaining a rezero process.

A process of changing the state from a servo off state to an on-track state is referred to as a rezero process. FIG. 11 is a flow chart for explaining this rezero process. In FIG. 11, a step S31 supplies a constant current to the VCM 11 in the servo off state where no demodulation of the servo information takes place, and holds the magnetic head 16 at standby or retracted position. When the rezero process is started in the state of the step S31, steps S32 and S33 are carried out in parallel. The step S32 carries out a blind seek, and the step S33 carries out a servo mark lock confirmation. The blind seek carries out a seek based on the estimated position of the magnetic head 16, on a precondition that the estimated position is correct. The servo mark lock confirmation locks the magnetic head 16 to the position of the servo mark of the servo information on the magnetic disk 15, and reads the servo information. After the steps S32 and S33, a step S34 confirms the present velocity of the magnetic head 16.

A step S35 carries out a discharge process, to control the velocity of the magnetic head 16 to become zero. A step S36 confirms the present position of the magnetic head 16 by use of the cylinder information (Gray code). A step S37 carries out a fine control, so as to finely adjust the present position of the magnetic head 16 to a desired position on the magnetic disk 15.

In the rezero process, it is important that the confirmation of the present velocity in the step S34 can be carried out quickly and accurately. However, as the recording density of the magnetic disk 15 used in the magnetic disk unit increases, it becomes more difficult to quickly and accurately confirm the present velocity of the magnetic head 16, mainly for the following Reasons 1 through 3.

Reason 1: As the recording density of the magnetic disk 15 becomes higher, it becomes necessary to minimize the proportion of the area on the magnetic disk 15 occupied by the servo region 15-1 which is recorded with the servo information, relative to the are on the magnetic disk 15 occupied by the data recording region 15-2, so that more data can be recorded. As a result, it is not possible to record the cylinder information (full Gray code) within one servo frame. Consequently, the cylinder information is divided into a plurality of servo frames and recorded. However, in order to demodulate the divided cylinder information, it is necessary to confirm the index and find out which servo frame is being reproduced. Accordingly, it takes too long a time to confirm the present velocity of the magnetic head 16.

Reason 2: In addition to the cylinder information, the magnetic disk 15 is recorded with position information which is made up of the same pattern which is repeated for every predetermined number of cylinders. Hence, the relative position of the magnetic head 16 can be demodulated based on the position information. But in a case where the same pattern is repeatedly recorded for every 32 cylinders, for example, 32 cylinders/sample and 64 cylinders/sample would appear as if they were the same velocity because the same pattern is repeated for every 32 cylinders. Therefore, the accurate velocity of the magnetic head 16 cannot be obtained by confirming the present velocity of the magnetic head 16 based on the position information.

Reason 3: When the magnetic disk unit is not operating, the magnetic head 16 is positioned at the standby or retracted position, and the magnetic head 16 is held at this standby or retracted position by a magnetic catching force of a magnet. This magnetic catching force tends to increase in order to improve the shock resistance performance of the magnetic disk unit. For this reason, even in a case where the driving force of the arm 14 slightly deviates from a target value due to a temperature change, a change caused by aging or the like, the magnetic head 16 may be returned to the standby or retracted position by the magnetic catching force during a blind seek or, the magnetic head 16 may reach a limit position on the opposite side from the standby or retracted position along the radial direction of the magnetic disk 15, thereby making it impossible to normally carry out the blind seek. As a result, even though it is assumed in the case of the blind seek that the magnetic head 16 is stopped at the desired position on the magnetic disk 15 at the end of the seek, there is a possibility that the magnetic head 16 is actually moving at a considerable velocity.

As described above under Reasons 1 through 3, it is extremely difficult to quickly and accurately confirm the present velocity of the magnetic head 16 after the blind seek.

Next, a description will be given of a third embodiment of the storage apparatus according to the present invention which is capable of quickly and accurately detecting the present velocity of the magnetic head 16. This third embodiment of the storage apparatus employs a third embodiment of the signal reproducing method according to the present invention. In this third embodiment, the present invention is applied to the magnetic disk unit having the RAID structure. The basic structure of this third embodiment of the storage apparatus is the same as the basic structure of the first embodiment of the storage apparatus shown in FIG. 1, and illustration and description thereof will be omitted.

Figure 12:
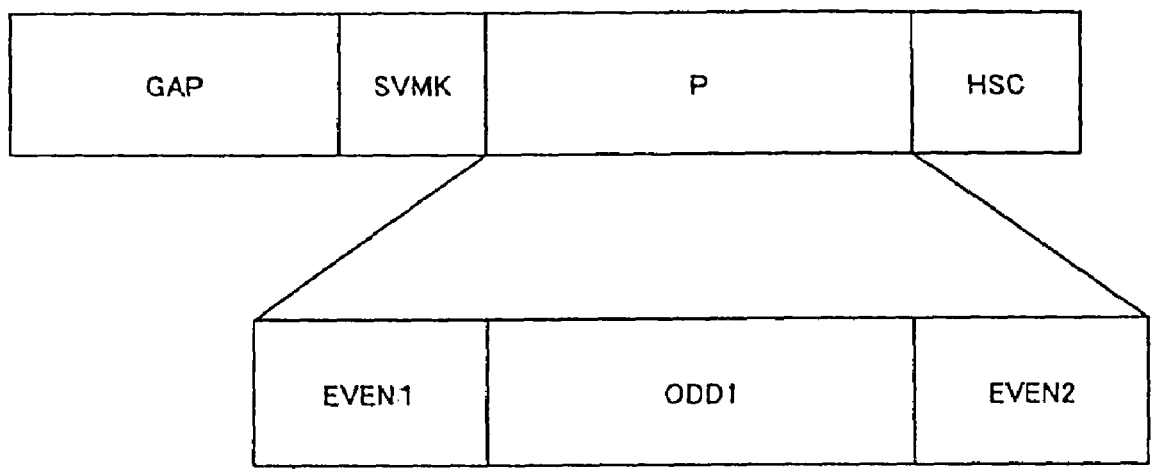
FIG. 12 is a diagram for explaining a STW pattern.

FIG. 12 is a diagram for explaining a servo track writer (STW) pattern of the servo information used in this embodiment. When switching the state from the write state to the read state in order to demodulate the servo information, the read cannot be made in a normal manner immediately because the read signal includes a transient component, and this is called write-to-read transient. In FIG. 12, a gap region GAP is provided to absorb this write-to-read transient. A servo mark SVMK indicates a start position of the servo information, and is made up of a special pattern which will not exist in the data region. A position region P is recorded with phase information for position demodulation, and as will be described later, includes EVEN1, ODD1 and EVEN2 layers. A region HSC is recorded with the cylinder number, the number assigned to the magnetic head, the sector number and the like.

Figure 13:
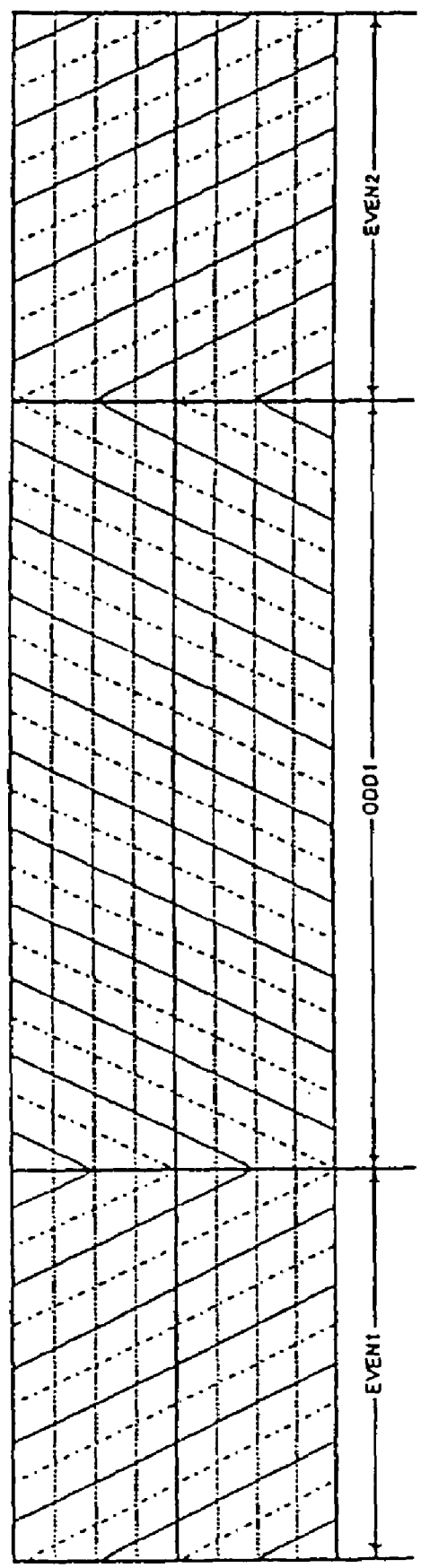
FIG. 13 is a diagram showing a recording pattern of phase information for position demodulation.

FIG. 13 is a diagram showing a recording pattern of the phase information for position demodulation, within the position region P. In FIG. 13, a dotted line in the horizontal direction indicates a boundary line between two adjacent tracks, an oblique solid line indicates a maximum value (peak) of the phase information, and an oblique broken line indicates a minimum value (bottom) of the phase information. The angles formed by the peak and bottom patterns with respect to the track are the same in the EVEN1 and EVEN2 layers, but are different from the angles formed by the peak and bottom patterns with respect to the track in the ODD1 layer. The original intended use of the phase information is to demodulate the present position of the magnetic head 16 from a phase error between the ODD1 layer and the EVEN1 and EVEN2 layers. In order to be able to calculate the phase error between the ODD layer and the EVEN layer with reference to the center of the ODD layer even when the magnetic head 16 has a non-zero velocity, the ODD1 layer is sandwiched between the EVEN1 and EVEN2 layers within the position region P. The position can be obtained by comparing the phases of a sum of the vectors of the EVEN1 and EVEN2 layers and a vector of the ODD1 layer.

Figure 14:
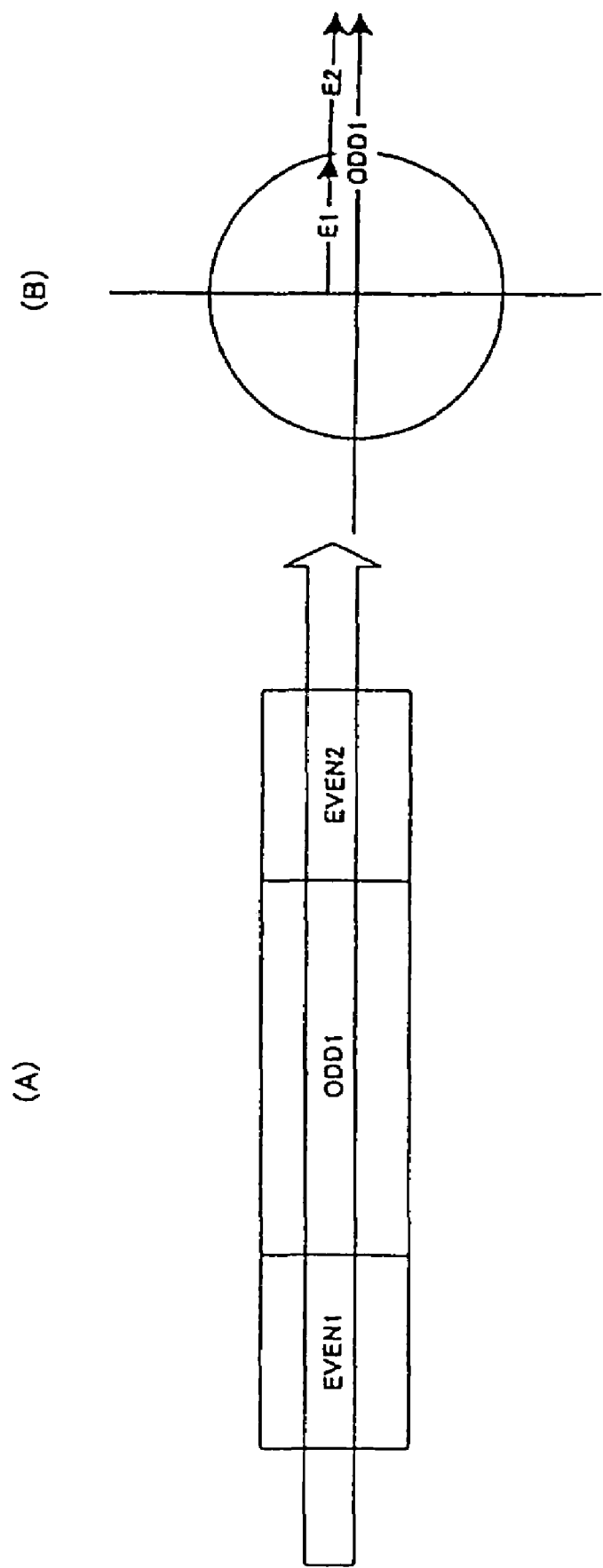
FIG. 14 is a diagram for explaining a state where a phase error is zero in a case where a magnetic head velocity is zero.

FIG. 14 is a diagram for explaining a state where the phase error is zero in a case where the velocity of the magnetic head 16 is zero. In FIG. 14, (A) indicates a scanning locus of the magnetic head 16 by an arrow, and (B) indicates a vector O1 of the ODD1 layer and a sum of vectors E1 and E2 of the EVEN1 and EVEN2 layers. In this case, the phase error between the ODD1 layer and the EVEN1 and EVEN2 layers is zero.

Figure 15:
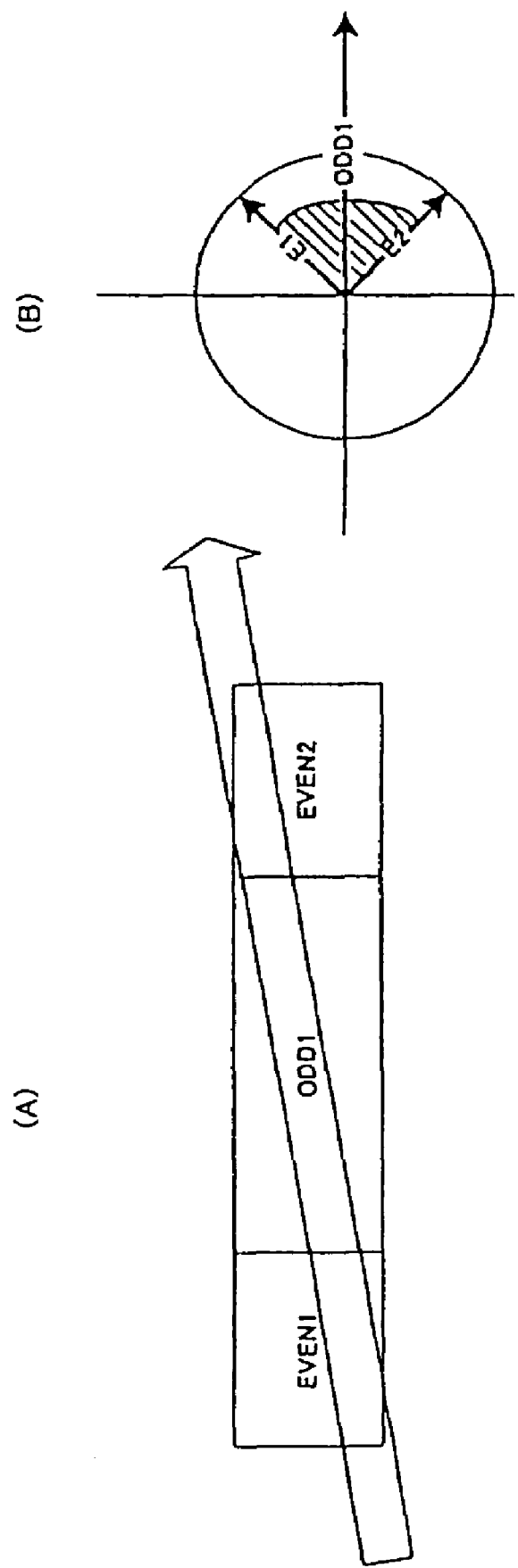
FIG. 15 is a diagram for explaining a state where a phase error is zero in a case where a magnetic head velocity is not zero.

FIG. 15 is a diagram for explaining a state where the phase error is zero in a case where the velocity of the magnetic head 16 is not zero (non-zero). In FIG. 15, (A) indicates a scanning locus of the magnetic head 16 by an arrow, and (B) indicates a vector O1 of the ODD1 layer and a sum of vectors E1 and E2 of the EVEN1 and EVEN2 layers. In this case, the phase error between the ODD1 layer and the EVEN1 and EVEN2 layers is zero.

By obtaining the sum of the vector E1 of the EVEN1 layer and the vector E2 of the EVEN2 layer and comparing this sum with the vector O1 of the ODD1 layer, it is possible to obtain the phase error between the ODD1 layer and the EVEN1 and EVEN2 layers and demodulate the position from this phase error. However, in FIG. 15(B), an angle formed by the vectors E1 and E1 and indicated by the hatching, is proportional to the moving velocity of the magnetic head 16. Hence, in this embodiment, the present velocity of the magnetic head 16 is confirmed by utilizing the phase error between the EVEN1 and EVEN2 layers. The velocity of the magnetic head 16 obtained from the phase error between the EVEN1 and EVEN2 layers includes the effects of the rotational deviations or inconsistencies of the SPM12, and the accuracy thereof is relatively poor. Accordingly, the accuracy of the velocity of the magnetic head 16 obtained from the phase error between the EVEN1 and EVEN2 layers may be improved by combining the obtained velocity with the position demodulation result. In other words, in the case of a 32-cylinder group, the velocity may be obtained using the position demodulation result for velocities of ±16 cylinders/sample or less, and the velocity may be obtained based on the phase error between the EVEN1 and EVEN2 layers for velocities greater than ±16 cylinders/sample.

Figure 16:
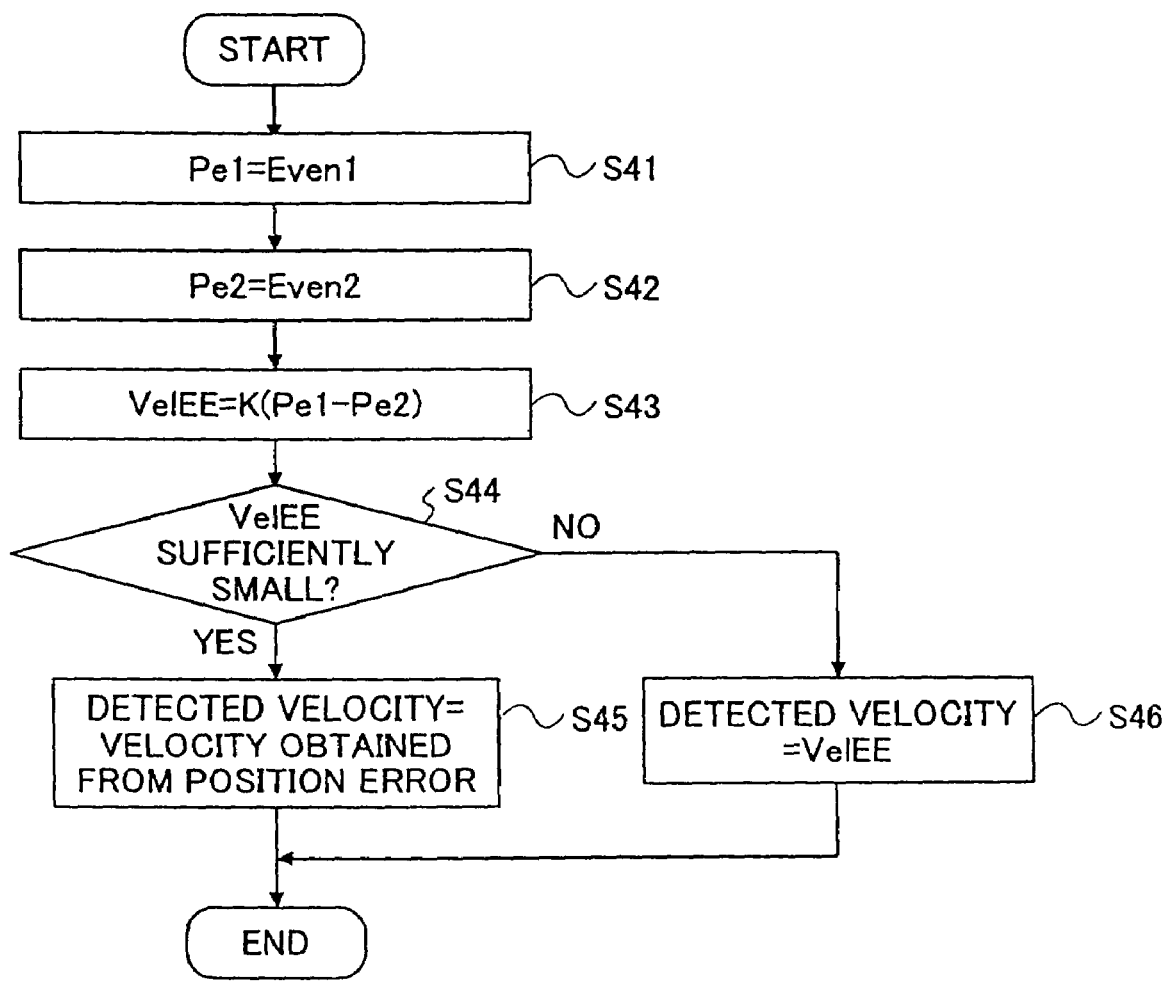
FIG. 16 is a flow chart for explaining an operation of a third embodiment of the storage apparatus according to the present invention.

FIG. 16 is a flow chart for explaining an operation of this third embodiment of the storage apparatus. A velocity detecting process shown in FIG. 16 is carried out by the DSP 2 shown in FIG. 1.

In FIG. 16, when the velocity detecting process is started, a step S41 sets Pe1 to the phase of the EVEN1 layer, and a step S42 sets Pe2 to the phase of the EVEN2 layer. A step S43 obtains a velocity VelEE of the magnetic head 16 from VelEE=K(Pe1-Pe2), where K denotes a velocity conversion coefficient. A step S44 decides whether or not the velocity VelEE is sufficiently small. In the case of the 32-cylinder group as described above, the decision result in the step S44 becomes YES if the velocity VelEE is ±16 cylinders/sample or less, and the decision result of the step S44 becomes NO if the velocity VelEE is greater than ±16 cylinders/sample. If the decision result in the step S44 is YES, a step S45 obtains the velocity of the magnetic head 16 from a difference between the present demodulated position and the previous demodulated position, and the process ends. On the other hand, if the decision result in the step S44 is NO, a step S46 regards the velocity of the magnetic head 16 as being the velocity VelEE, and the process ends. When obtaining the velocity of the magnetic head 16 by the step S46, it is possible to obtain the velocity within one sample, unlike the step S45.

According to this embodiment, it is possible to quickly obtain the correct velocity of the magnetic head 16, even when the velocity of the magnetic head 16 is relatively high, so that the success rate of the rezero process is improved. In addition, the velocity detecting process of this embodiment is not limited to the rezero process, and may also be employed in processes such as a process which is carried out to stop the magnetic head 16 at a neighboring cylinder when a seek error is generated. In other words, the velocity detecting process of this embodiment is suited for detecting the velocity of the magnetic head 16 when the magnetic head 16 is moving at a relatively high velocity.

Therefore, according to the present invention, it is possible to secure a sufficient phase margin of the control system. In a case where the computation process which amounts to only approximately 10 to 20 percent of the filter calculation, which requires the demodulation result of the present sample, is carried out during the time after the position demodulation to the time when the current value is output with respect to the VCM, it is possible to greatly reduce the computation delay. The effect of reducing the computation delay becomes greater as the number n of the nth-order filter becomes larger. On the other hand, in a case where the prediction error is regarded as a kind of external disturbance and the feedback path is provided to feed back the prediction error, it is possible to increase the gain without using up the phase margin of the control system.

When obtaining the velocity of the magnetic head based on the phase error of the EVEN layer within the position region, it is possible to quickly obtain an accurate velocity of the magnetic head even when the velocity is relatively high. As a result, it is possible to improve the success rate of the rezero process or the like.

Further, the present invention is not limited to these embodiments, but various variations and modifications may be made without departing from the scope of the present invention.

What is claimed is:

1. A signal reproducing method for reproducing servo information recorded on a recording medium by use of a head, comprising the steps of:
   (a) obtaining a prediction error by subtracting an estimated position of the head from an actual position of the head on the recording medium obtained from reproduced servo information; and
   (b) feeding back the prediction error to a control system which calculates a current value for driving the head via a first route and a second route that are separate from each other,
   wherein said first route subjects the prediction error to a process that includes a multiplication by a coefficient when making a feed back, and said second route supplies the prediction error directly to said control system when making the feed back.

2. The signal reproducing method as claimed in claim 1, wherein said first route includes a route configured to generate an estimation bias from the prediction error, a route configured to generate an estimated velocity from the predicition elTor, and a route configured to generate an estimated position from the prediction error, and feeds back the estimation bias, the estimated velocity and the estimated position to the control system.

3. The signal reproducing method as claimed in claim 1, further comprising:
   (c) concentrating a feedback of the prediction error via said second route to a beginning portion of a multi-rate output of a current, when outputting the current value in a plurality of steps by a multi-rate control.

4. A signal reproducing method for reproducing servo information recorded on a recording medium by use of a head, comprising the steps of:
   (a) obtaining a prediction error by subtracting an estimated position of the head from an actual position of the head on the recording medium obtained from reproduced servo information;
   (b) feeding back the prediction error to a control system which calculates a current value for driving the head; and
   (c) concentrating a feedback of the prediction error to a beginning portion of a multi-rate output of a current, when outputting the current value in a plurality of steps by a multi-rate control.

5. A storage apparatus comprising:
   a reproducing part configured to reproduce servo information recorded on a recording medium by use of a head;
   part configured to obtain a prediction error by subtracting an estimated position of the head from an actual position of the head on the recording medium obtained from reproduced servo information; and
   a feedback part configured to feed back the prediction error to a control system which calculates a current value for driving the head via a first route and a second route that are separate from each other,
   wherein said first route subjects the prediction error to a process that includes a multiplication by a coefficient when making a feed back, and said second route supplies the prediction error directly to said control system when making the feed back.

6. The storage apparatus as claimed in claim 5, wherein said first route includes a route configured to generate an estimation bias from the prediction error, a route configured to generate an estimated velocity from the prediction error, and a route configured to generate an estimated position from the prediction error, and feeds back the estimation bias, the estimated velocity and the estimated position to the control system.

7. The storage apparatus as claimed in claim 5, further comprising:
   a control part configured to concentrate a feedback of the predicition error via said second route to a beginning portion of a multi-rate output of a current, when outputting the current value in a plurality of steps by a multi-rate control.

8. A storage apparatus comprising:
   a reproducing part configured to reproduce servo information recorded on a recording medium by use of a head:
   a part configured to obtain a prediction error by subtracting an estimated position of the head from an actual position of the head on the recording medium obtained from reproduced servo information;
   a feedback part configured to feed back the predicition error to a control system which calculates a current value for driving the head; and
   a control part configured to concentrate a feedback of the prediction error to a beginning portion of a multi-rate output of a current, when outputting the current value in a plurality of steps by a multi-rate control.

* * * * *

UNITED STATES PATENT AND TRADEMARK OFFICE
CERTIFICATE OF CORRECTION

PATENT NO. : 7,292,404 B2 Page 1 of 1
APPLICATION NO. : 10/870667
DATED : November 6, 2007
INVENTOR(S) : Saito It is certified that error appears in the above-identified patent and that said Letters Patent is hereby corrected as shown below:

In the Claims:

Col. 13, line 5, delete "elTor" and insert --error--.

Col. 13, line 33, insert --a-- before "part".

Signed and Sealed this

Tenth Day of June, 2008

JON W. DUDAS
*Director of the United States Patent and Trademark Office*